United States Patent [19]

Streets et al.

[11] 4,318,837

[45] Mar. 9, 1982

[54] ADHESIVE FOR WOOD AND VINYL

[75] Inventors: Roger L. Streets, Mansfield; John Von Kamp, New London, both of Ohio

[73] Assignee: The Goodyear Tire & Rubber Company, Akron, Ohio

[21] Appl. No.: 608,478

[22] Filed: Aug. 28, 1975

[51] Int. Cl.³ .............................................. C08L 67/06
[52] U.S. Cl. ................... 524/364; 156/331.4; 156/332; 428/481; 525/440; 525/444; 524/361
[58] Field of Search ............... 260/860, 858, 32.8 R; 156/331.4, 332; 525/440; 428/481

[56] References Cited

U.S. PATENT DOCUMENTS

| | | | |
|---|---|---|---|
| 2,642,403 | 6/1953 | Simon et al. | 260/860 |
| 3,010,934 | 11/1961 | Nischk | 260/858 |
| 3,079,364 | 2/1963 | Schmidt | 260/860 |
| 3,773,595 | 11/1973 | Burba et al. | 156/332 |

FOREIGN PATENT DOCUMENTS 226302  2/1959  Australia ............................ 260/860

OTHER PUBLICATIONS

Nakajima, N.; Fractionation of Linear Polyethylene with Gel Permeation Chromatography; *American Chemical Society,* Advances in Chemistry Series 125 (1973), pp. 98–107.

*Primary Examiner*—Wilbert J. Briggs, Sr.
*Attorney, Agent, or Firm*—J. D. Wolfe

[57] ABSTRACT

An adhesive composition consisting of a mixture of 100 parts of saturated polyester and 5 to 150 parts of unsaturated polyester containing 5 to 15 parts of an organic polyisocyanate, which is suitable for adhering wood to vinyl film.

7 Claims, No Drawings

ADHESIVE FOR WOOD AND VINYL

This invention relates to an adhesive. More particularly, this invention relates to an adhesive for laminating wood to vinyl polymers or resins.

It has been desirable to adhere vinyl resin parts or films to wood to protect the wood and also to give the wood certain desirable aesthetic effects, as vinyl film can have printed thereon any design effect. Unfortunately, difficulty has been experienced in obtaining good hot strength and adhesion between the vinyl part and the wood and also the adhesives useful for adhering vinyl to wood have tended to have a very short pot life and therefore could not be made and utilized for relatively long times.

The adhesive of this invention comprises a fluid blend of 100 parts of a saturated polyester composed of the condensation product of an organic dicarboxylic acid or anhydride with a glycol to obtain a molecular weight of 10,000 to 30,000 with the preferred range being 15,000 to 26,000, five to 150 parts of an unsaturated polyester obtained by condensing an unsaturated acid or anhydride such as malaic or fumaric, either alone or in conjunction with 0 to 70 percent by weight of isophthalic acid with a simple glycol, or preferably bis phenol A to obtain a condensate of 10,000 to 30,000 molecular weight and 5 to 15 parts of an organic polyisocyanate, preferably of the polymeric type. The fluidity of the above blend is primarily a function of the molecular weight of the polyester used and the amount of solvent. Suitable solvents are the ketones such as acetone, methyl ethyl ketone, isopropyl butyl ketone and blends of these ketones with toluene and xylene. Sufficient solvent, usually five to 20 percent, is used to permit the adhesive to be readily applied by spraying or painting.

The nature of this invention more readily may be seen and understood along with its advantages by reference to the following example, wherein all parts and percentages are by weight.

EXAMPLE

Five parts of the polyester obtained by condensation of 50 parts isophthalic acid and 50 parts fumaric acid with sufficient bisphenol A to give a molecular weight of 20,000 were blended with 100 parts of a saturated polyester obtained by condensing 50 parts ethylene glycol, 50 parts neopentyl glycol with sufficient terephthalic acid to obtain a condensate having a molecular weight of 20,000. To this blend of saturated and unsaturated polyesters 10 parts of a polymeric polyisocyanate made by phosgenation of the acid rearrangement product of aniline and formaldehyde was added and thoroughly mixed to give the adhesive. This adhesive hereinafter called "modified adhesive", has a pot life in excess of 48 hours and was utilized to coat a piece of wood and then a vinyl chloride film was spread over the wood and pressed into tight relationship to form a laminate. A control adhesive was prepared by replacing the unsaturated polyester with the saturated polyester in the above recipe. This control adhesive was used to prepare a laminate in the manner described above and the 90° peel strength in pounds per inch was determined on the two specimens. The peel strength on these specimens are shown for the time intervals indicated in the table below:

| Time, in hours | 90° PEEL STRENGTHS, LBS/INCH | | | | |
|---|---|---|---|---|---|
| | Initial | 2 | 24 | 168 | 336 |
| Adhesive used, control | 6.0 lb/in | 10.0 lb/in | vinyl tear | vinyl tear | vinyl tear |
| Modified | 7.0 lb/in | 14–15 lb/in | vinyl tear | vinyl tear | vinyl tear |

This modified adhesive gave superior peel strength initially as well as after two hours.

If the adhesive of the above modified adhesive is replaced with Adhesive A, similar good adhesion is obtainable. Adhesive A can be made by mixing 5 to 25 parts of polyester of ethylene glycol, 50/50 isophthalate-fumarate of about 18,000 to 25,000 molecular weight with 100 parts of ethylene terephthalate of 16,000 to 24,000 molecular weight and 7 to 12 parts of a commercial polymethylene polyphenylisocyanate or a similar polyisocyanate.

The saturated polyesters useful in this invention can be illustrated by the following formula:

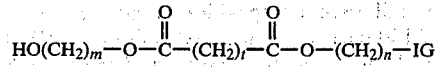

where m, n and t are integers representing the number of —CH$_2$— groups in glycol and acid respectively. The saturated polyesters can be homo or copolyesters.

Representative of the copolyesters usable in the above example are those containing units from ethylene glycol and units from neopenthyl glycol in the ratio of 56/44 and units from terephthalic acid and sebacic acid in the ratio of 71/29.

The example illustrates the invention with respect to the use of a specific copolyester of sebacid acid, terephthalic acid, ethylene glycol and neopentyl glycol. Such resins of a range of compositions can be used. For example, the ethylene glycol units can range from 40 to 60 percent of the total glycol units, the neopentyl glycol units can range from 60 to 40 percent of the total, the terephthalic acid units can range from 20 to 75 percent of the total acid units and the sebacic acid units can range from 80 to 25 percent of the total acid units.

Other copolyester resins can be used in place of the ethylene glycol-neopentyl glycol-terephthalate sebacate copolyester used in the example. Representative examples of such copolyesters are ethylene-neopentyl terephthalate isophthalate isophthalate copolyesters in which the ratio of ethylene glycol units to neopentyl glycol units is in the range of 40/60 to 60/40 and the terephthalic acid units and isophthalic acid units in the copolyester are present in the range of 95/5 to 50/50 and tetramethylene-terephthalate isophthalate sebacate copolyesters in which the units of the acids are present in the range of 20 to 50 of terephthalic units to 5 to 50 is isophthalic units and 50 to 20 percent of sebacic units.

The unsaturated polyesters are of essentially the same structure as the saturated polyesters except part or all of the saturated organic acids have been replaced with unsaturated organic acids or anhydrides such as malaic or fumaric and related unsaturated acids.

Typical polyisocyanates suitable for the purposes of the present invention include, among others, 1,5-naphthalene diisocyanate, 4,4'-diphenyl diisocyanate, 4,4'-diphenylene methane diisocyanate, p-phenylene diisocyanate, 2,4-tolylene diisocyanate, 4,4',4"-triphenyl methane triisocyanate, 4,4'-tolidine diisocyanate, dianisidine diisocyanate, hexamethylene diisocyanate, r,r'-diisocyanate of diphenyl ether and mixtures thereof.

The polymeric polyisocyanates such as the one obtained by phosgenation of acid rearrangement product of reaction of aldehydes and aromatic amines such as formaldehyde amd aniline are most preferred and are referred to generically as poly aryl polyisocyanate and are available commercially as polymethylene polyphenylisocyanate.

The vinyl resins or fims useful in this invention are well known and comprise polyvinyl chloride or copolymers of vinyl chloride and vinyl acetate or vinylidene chloride. Where high flexibility is desired usually the vinyl resin is plasticized with from 10 to 150 parts per hundred of the normal vinyl resin plasticizers.

While certain representative embodiments and details have been shown for the purpose of illustrating the invention, it will be apparent to those skilled in this art that various changes and modifications may be made therein without departing from the spirit or scope of the invention.

What is claimed is:

1. An adhesive composition composed of a fluid blend of 100 parts of a saturated polyester of 10,000 to 30,000 molecular weight composed of the condensation product of an organic dicarboxylic acid or anhydride with a glycol and 5 to 150 parts of an unsaturated polyester of 10,000 to 30,000 molecula weight containing 5 to 15 parts of an organic polyiisocyanate selected from the class consisting of 4,4'-diphenylene methane diisocyanate, tolylene diisocyanate, 4,4'-tolidine diisocyanate and polymethylene polyphenyl isocyanates, said unsaturated polyester containing unsaturation from condensation of an organic acid or anhydride selected from the class of maleic and fumaric acid or anhydride with a glycol and sufficient solvent selected from the class consisting of ketones of acetone to isopropylbutyl ketone and blends of said ketones with toluene and xylene to permit the adhesive to be painted during its pot life.

2. The adhesive composition of claim 1 wherein the polyisocyanate is a polymethylene polyphenylisocyanate.

3. The adhesive composition of claim 1 containing sufficient solvent to permit adhesive to be applied by painting.

4. The adhesive composition of claim 1 wherein the solvent is a ketone or a blend of ketone with toluene or xylene and is present in amounts of 5 to 20 percent by weight.

5. The adhesive composition of claim 1 wherein the saturated polyester has the structure obtained by condensing a glycol with isophthalic, terephthalic, phthalic and sebacic acids or mixtures thereof.

6. The adhesive of claim 1 wherein the glycol is bisphenol A.

7. Wood coated with an adhesive composition composed of a fluid blend consisting essentially of 100 parts of a saturated polyester of 10,000 to 30,000 molecular weight composed of the condensation product of an organic dicarboxylic acid or anhydride with a glycol and 5 to 150 parts of an unsaturated polyester of 10,000 to 30,000 molecular weight containing 5 to 15 parts of an organic polyisocyanate selected from the class consisting of 4,4'-diphenylene methane diisocyanate, tolylene diisocyanate, 4,4'-tolidine diisocyanate and polymethylene polyphenyl isocyanates, said unsaturated polyester containing unsaturation from condensation of an organic acid or anhydride selected from the class of maleic and fumaric acid or anhydride with a glycol and sufficient solvent selected from the class consisting of ketones of acetone to isopropylbutyl ketone and blends of said ketones with toluene and xylene to permit the adhesive to be painted during its pot life.

* * * * *